July 2, 1946. W. BORTOLOTTI 2,403,335
FIXTURE FOR SPREADING MORTAR ON GLASS BLOCKS
Filed Oct. 23, 1944 2 Sheets-Sheet 2

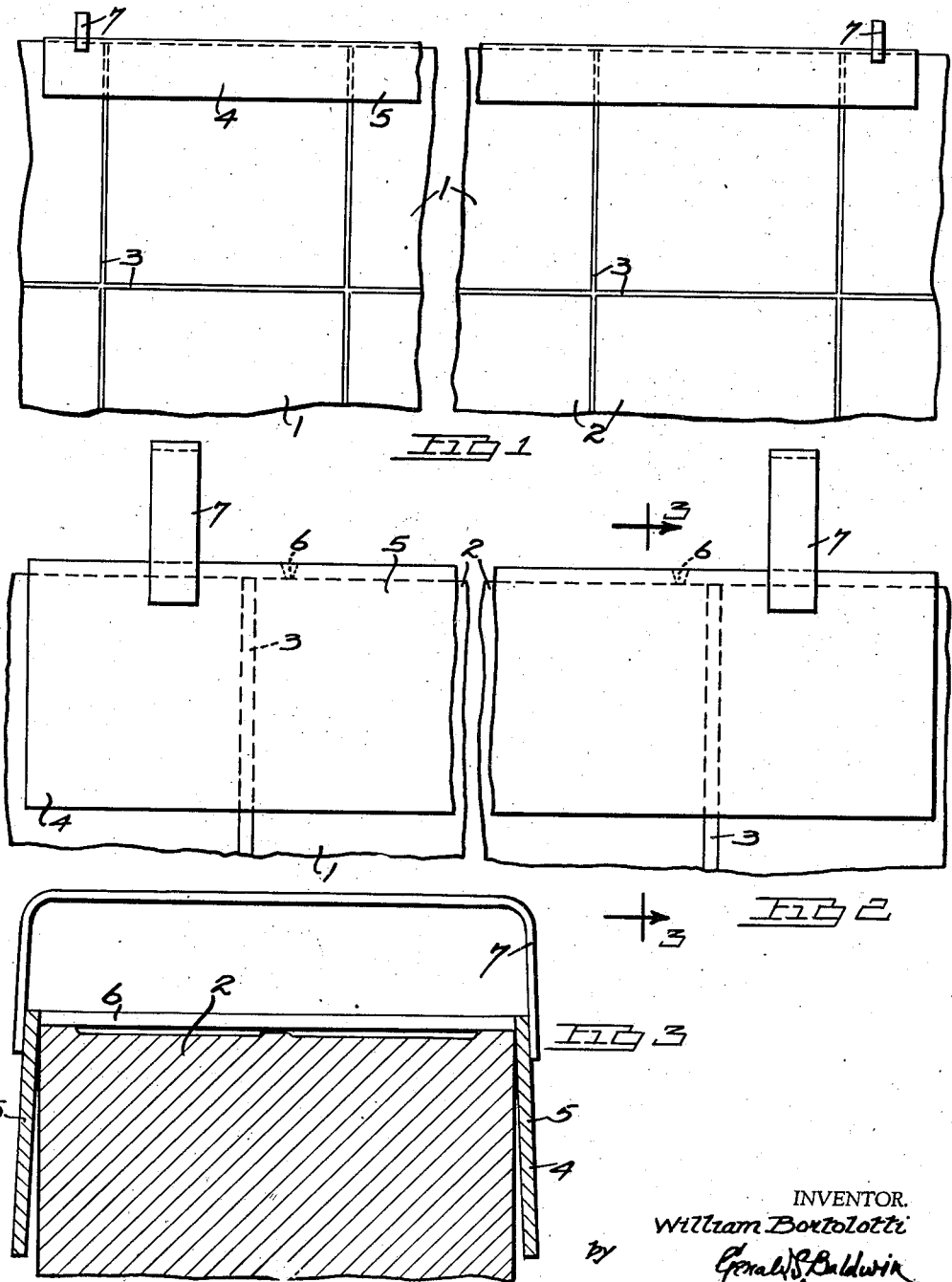

INVENTOR.
William Bortolotti
BY
his Attorney.

Patented July 2, 1946

2,403,335

UNITED STATES PATENT OFFICE 2,403,335

FIXTURE FOR SPREADING MORTAR ON GLASS BLOCKS

William Bortolotti, Detroit, Mich.

Application October 23, 1944, Serial No. 560,067

2 Claims. (Cl. 72—128)

This invention relates to improvements in fixtures for spreading mortar on glass blocks, and refers particularly to a fixture to be placed horizontally upon a course of glass blocks to facilitate uniform spreading of mortar upon the latter.

Due to the fact that glass blocks are water repellant whereas bricks and cement blocks absorb moisture, it is far more difficult to build a wall, or wall section, of glass blocks than of bricks or cement blocks, because a bond is formed between the latter and the mortar as absorption occurs, whereas there is no absorbent action when glass blocks are laid. As the bond created by absorption between mortar and either bricks or cement blocks is lacking in the case of glass blocks displacement of the latter while mortar is setting is very liable to occur, and results in either bulging of the wall or misalignment of the blocks or both. To overcome this tendency many builders only lay a few courses of glass blocks at a time and allow the mortar to set before continuing, but as all moisture in the mortar between glass blocks must be dissipated by evaporation from the front or rear edges long delays are caused by waiting for the mortar to set, much longer in fact than would be required for the setting of mortar joints between bricks or cement blocks by which part of the moisture would be absorbed. It should also be borne in mind that one of the most frequent reasons for using glass blocks is to produce an ornamental appearance, and therefore it is quite important that the width of the mortar joints be uniform and that the blocks be set in both vertical and horizontal alignment.

When laying glass blocks, in order to obtain mortar joints which are both uniform in thickness and solid and watertight throughout their depth, and also to minimize the tendency for the blocks to move after they have been laid, I find that it is necessary to use a very stiff and relatively dry mortar, that is mortar which is far stiffer and dryer than that ordinarily employed when laying bricks or cement blocks. Due, however, to the water repellant properties of glass blocks it is very difficult indeed to spread this stiff mortar upon a course of blocks without displacing them either longitudinally or transversely or both. It is therefore an object of this invention to provide a fixture to be placed over a course, or part of a course, of glass blocks which functions: Firstly as a form so that mortar may more easily be spread uniformly and to the desired depth upon the blocks; secondly as a bracing means for retaining all the blocks thus engaged immovable, and thereby preventing displacement of any block relative to the others; and thirdly, in the case of curved walls, as a templet to insure that the correct curvature is maintained as the height of the wall increases. Thus I aim to provide a fixture with the aid of which a wall of considerable height may be built without waiting for the mortar joints on the lower courses to dry, and without fear of the wall bulging or individual blocks becoming displaced.

Another object of the invention is to provide a fixture including two plates to engage the front and rear faces of a course of glass blocks and to project a uniform distance above the tops of the said blocks, and cross members extending at intervals between the plates to retain the latter uniformly spaced throughout their length.

A further object of the invention is to provide such a fixture wherein the plates are arranged at a downward and outward inclination to one another and are so spaced that they bear against the front and rear of the blocks adjacent the tops of the latter, to permit the removal of the fixture without disturbing the alignment of the blocks or the fresh mortar bed spread upon them. Moreover the opposite sides of the cross members are also downwardly and inwardly tapered so that they too may be withdrawn from the mortar bed without disturbing the latter.

Another object of the invention is to provide such a fixture which may be made with its spaced plates either flat throughout their length to engage opposite sides of a straight wall, or shaped to engage opposite sides of a curved wall.

Yet another object of the invention is to provide such a fixture which is cheap and simple to manufacture, and which may be quickly and easily mounted in position upon a course of glass blocks or removed therefrom.

Having thus broadly stated some of the objects and advantages of the invention I will now proceed to describe it in detail with the aid of the accompanying drawings, in which:

Figure 1 illustrates a section of a straight wall of glass blocks on the upper course of which the fixture is mounted.

Figure 2 is a view similar to Figure 1 but on an enlarged scale.

Figure 3 is a section on the line 3—3 of Figure 2.

Figure 4:
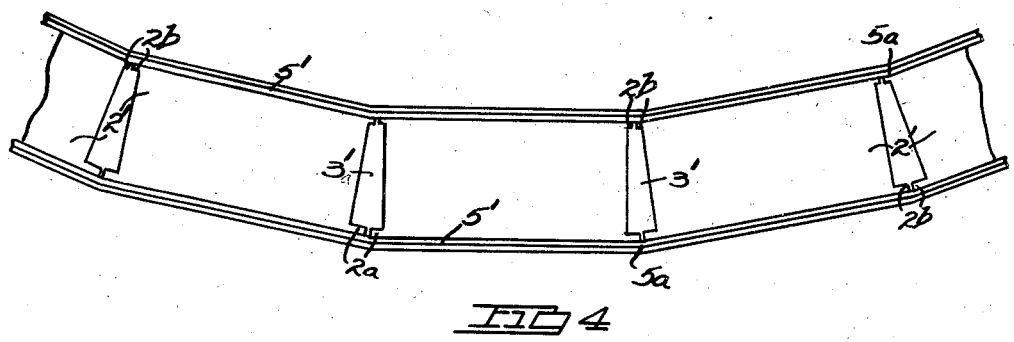
Figure 4 is a plan view showing part of a curved wall made of glass blocks and with a modified form of the fixture mounted thereon.

Referring first to Figures 1, 2 and 3, I designates a section of a flat wall consisting of a plurality of glass blocks 2, and 3 denotes mortar joints between the blocks. My fixture 4 consists of two plates 5 held in uniformly spaced relation throughout their length by cross members 6. The plates are arranged in downwardly and outwardly tapering relation so that the spacing between them is narrowest between their upper margins; and in this instance the plates are flat throughout their length. The cross members 6 extend between the plates 5 adjacent the upper extremities of the latter and are welded or otherwise suitably secured at their ends to the said members. The vertical distance between the undersides of the members 6 and the upper faces of the plates 5 must in all cases be the same, and the opposite sides of the said members are downwardly and inwardly tapered. 7 denotes handles which in the present instance are U-shaped and are secured at their ends to the plates 5 to facilitate handling of the fixture.

The fixture 4 is placed in position over a course of blocks 2 with the cross members 6 resting upon the tops of the said blocks. Due to the fact that the vertical distance from the undersides of the members 6 to the upper margins of the plates 5 is in all cases the same it follows that these upper margins throughout their length project a uniform distance above the tops of the blocks 2, and this vertical distance controls the depth of a mortar bed spread upon the blocks. The width of the spacing between the plates 5 adjacent their upper extremities is such that throughout their length they contact the front and rear faces of the blocks 2 substantially at the top of the latter, thereby holding all the blocks in alignment. Mortar is then spread upon the upper faces of the blocks level with the upper margins of the plates 5 so that the latter act as forms during the spreading of a mortar bed which is of uniform thickness throughout its length. After the bed has been spread the fixture may be easily lifted off with the aid of the handles 7. The downward and outward inclination of the plates 5 permits the removal of the fixture without fear of disturbing the alignment of the blocks 2, or the fresh mortar bed thereon, and the downward and inward inclination of the opposite sides of the cross members 6 allows them to be lifted out of the mortar bed without disturbing it. Obviously for mortar joints of different thicknesses the cross members 6 must be arranged to project different distances beneath the upper margins of the plates 5.

Figure 5:
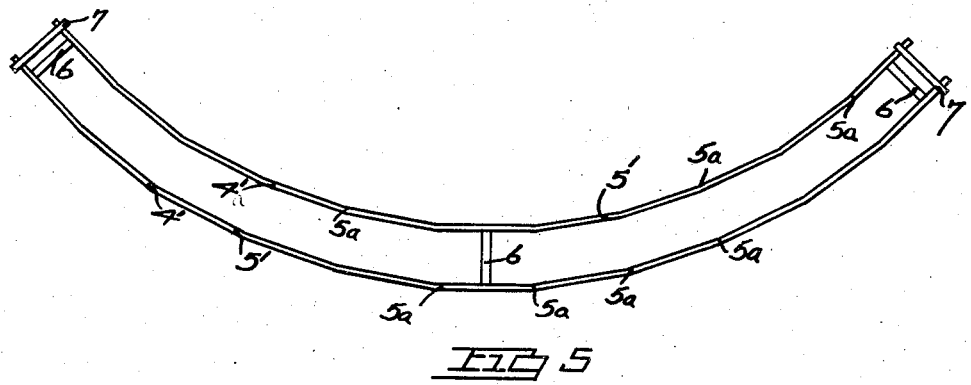
Figure 5 is a plan view, on a smaller scale, showing the modified form of fixture used for the construction of a curved wall.
Figure 6:
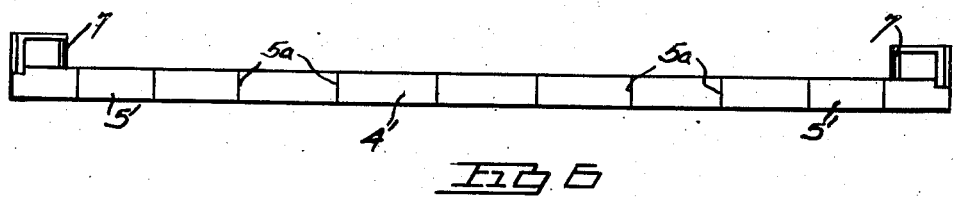
Figure 6 is a side elevation of Figure 5.

Referring now to Figures 4, 5 and 6 wherein a modified form of my fixture 4' is shown for use upon a curved wall, it will be noted that standard glass blocks 2' made for this purpose are employed. From the front and rear faces of these blocks, which are flat, vertical flanges 2a and 2b project outwardly. The front flanges 2a are wider than the rear flanges 2b so that when the flanges on adjacent pairs of blocks are uniformly and equally spaced from one another the blocks are at the inclination to one another to describe the desired contour. In this case it will be noted that intermediately of their depth the vertical mortar joints 3' between the blocks 2' are of materially increased width.

The fixture 4', as before, consists of two plates 5' spaced by cross members 6, and provided with handles 7. The plates are again arranged in downwardly and outwardly tapering relation, and the cross members have their opposite sides downwardly and inwardly inclined. However in this modification the plates 5' are divided into sections offset from one another at regular intervals to correspond to the inclination of the blocks 2' to one another; and in this case also the inner faces of the plates 5' adjacent their upper extremities bear against the front and rear faces of the blocks 2'.

While in the foregoing the preferred embodiments of the invention have been described and shown, it is understood that alterations and modifications may be made thereto provided the said alterations and modifications fall within the scope of the appended claims.

What I claim is:

1. A fixture for spreading mortar on glass blocks of uniform cross section including two substantially vertical plates of considerable length uniformly spaced from one another throughout their length, said plates tapering downwardly and outwardly with the upper portions thereof engaging the upper side edges of said blocks and the lower portions thereof being spaced from the sides of said blocks, and narrow cross members of uniform section throughout their length extending transversely between and secured at their extremities to said plates at points remote from the ends thereof, the undersides of said members being spaced a uniform distance beneath the upper edges of the plates and adapted to extend across the tops of said blocks to facilitate the spreading of a layer of stiff mortar of uniform thickness through the entire length and width of the blocks between said plates.

2. The combination in claim 1, wherein the cross members are imperforate and substantially parallel throughout their length and having downwardly and inwardly tapered sides to facilitate their removal after the stiff mortar has been spread upon the blocks.

WILLIAM BORTOLOTTI.